(No Model.)

R. S. WILLIAMS.
BICYCLE TIRE.

No. 572,463. Patented Dec. 1, 1896.

Witnesses:
Will. A. Barr.
F. D. Goodwin

Inventor:
Robert S. Williams
by his Attorneys
Howson & Howson

THE NORRIS PETERS CO., PHOTO-LITHO., WASHINGTON, D. C.

UNITED STATES PATENT OFFICE.

ROBERT S. WILLIAMS, OF MERCHANTVILLE, NEW JERSEY.

BICYCLE-TIRE.

SPECIFICATION forming part of Letters Patent No. 572,463, dated December 1, 1896.

Application filed June 8, 1896. Serial No. 594,725. (No model.)

*To all whom it may concern:*

Be it known that I, ROBERT S. WILLIAMS, a citizen of the United States, and a resident of Merchantville, Camden county, New Jersey, have invented certain Improvements in Bicycle-Tires, of which the following is a specification.

The object of my invention is to protect the tread of an ordinary inflated wheel-tire by a supplementary channeled tire, which is of such material that it will yield with the inflated tire and which will be held in place by the said tire when inflated.

A further object of the invention is to make the supplementary tire of an elastic material preferably of less elasticity than the inflated tire, so that when the inflated tire is expanded by inflation it will not only hold the supplementary tire in position, but the supplementary tire itself will stretch slightly, so that positive fit is insured.

Figure 2:
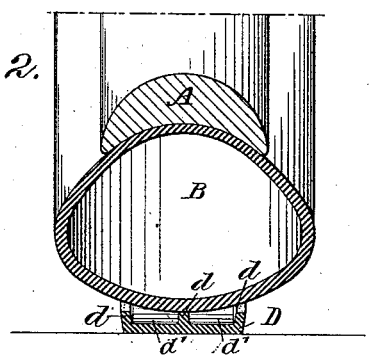
Figure 3:
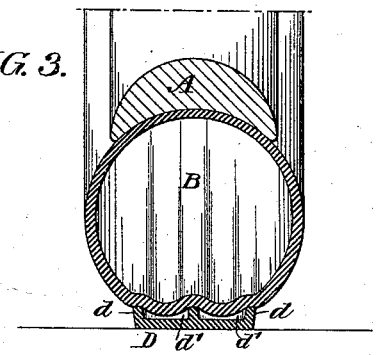
Figure 1:
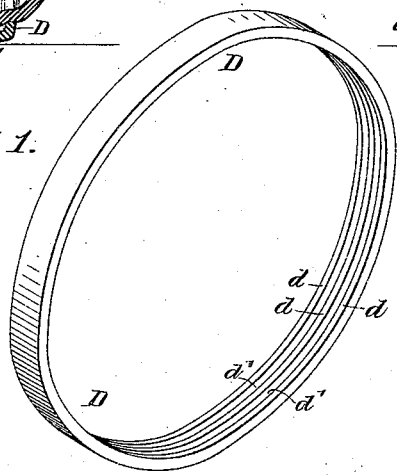

In the accompanying drawings, Figure 1 is a detached perspective view of my improved supplementary tire for bicycles. Fig. 2 is a sectional view showing the supplementary tire in position with the main tire deflated. Fig. 3 is a view similar to Fig. 2, showing the main tire inflated. Figs. 4, 5, 6, and 7 are views illustrating different forms of the supplementary tire combined with the inflated main tire.

The ordinary inflated tires, especially those used on bicycles, are punctured in many ways, and especially by sharp pieces of glass, stone, or metal, which work into the material of the tire and finally form a puncture.

By providing the wheel with a supplementary channeled tire similar to that shown in the drawings I am enabled to prevent the puncturing of the main tire to a certain degree and the main tire is free from abrasion.

A is the felly of the wheel.

B is the main tire, which may be of any of the forms now in common use, and D is the supplementary tire adapted to the periphery of the main tire B. The inner face of this supplementary tire has ribs $d$. Between these ribs are annular chambers $d'$. The ribs $d$ form locks, so that when the main tire is inflated a portion of the main tire will extend into the channels $d'$, thus preventing the lateral displacement of the supplementary tire. This supplementary tire may in some cases be cemented to the main tire or riveted thereto, if necessary, so as to prevent it becoming detached when the main tire is deflated.

Figure 7:
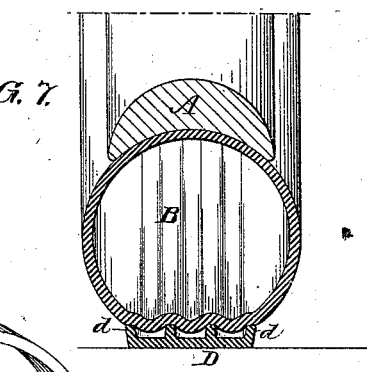

In Figs. 2 and 3 I have shown the supplementary tire provided with three ribs, but it will be understood that two ribs may be used, and in some instances four or more ribs may be provided, as shown in Fig. 7.

Figure 4:
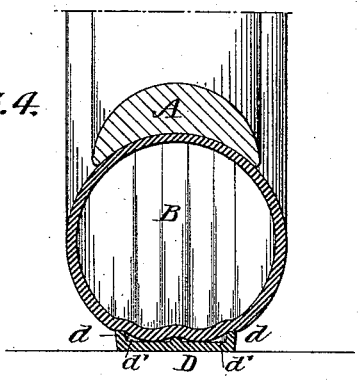
Figure 5:
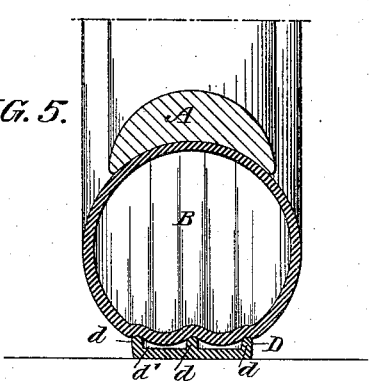
Figure 6:
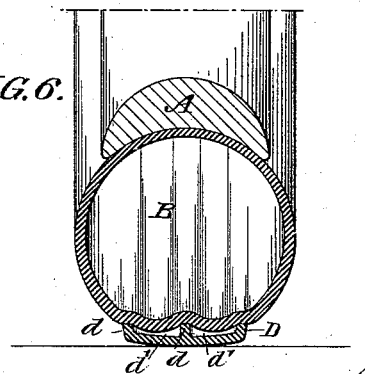

In Fig. 4 I have shown the central rib less in height than the side ribs and the edges of the ribs sharp. In Fig. 5 I have shown the edges of the ribs rounded, and in Fig. 6 I have shown the tread of the tire convex.

It will be understood that other modifications may be made without departing from my invention, the main feature of which is to provide a supplementary tire with ribs on its inner face for the purposes set forth.

The channels prevent the passage of tacks, small stones, glass, &c., which may pass through the supplementary tire from entering the main tire, the stones, &c., entering the channels and remaining therein until the supplementary tire is removed.

The channels in the supplementary tire are so constructed that only a portion of the main tire is forced therein when the latter is inflated, as shown in the drawings, thus providing permanent channels for the reception of tacks, small stones, pieces of glass, &c., which, as indicated, may be readily removed by simply deflating the main tire, when the supplementary tire can be quickly detached and replaced after the channels are cleared.

When it is not wished to use the supplementary tire, it may be detached and hung on the frame of the machine.

I claim as my invention—

1. The combination of an inflatable main tire, with a supplementary tire, having ribs on its inner surface so constructed that when the main tire is inflated there will be permanent channels between the outer face of the inflated tire and the inner face of the supplementary tire, substantially as specified.

2. The combination of an inflatable tire, with an elastic supplementary tire having ribs on its inner surface so constructed that when the main tire is inflated there will be permanent channels between the outer face of the inflated tire and the inner face of the supplementary tire, substantially as specified.

In testimony whereof I have signed my name to this specification in the presence of two subscribing witnesses.

ROBERT S. WILLIAMS.

Witnesses:
F. E. BECHTOLD,
JOS. H. KLEIN.